(12) United States Patent
Keller

(10) Patent No.: US 8,781,279 B2
(45) Date of Patent: Jul. 15, 2014

(54) TIGHT BUFFER FIBER OPTIC CABLES FOR CONDUITS

(75) Inventor: David Keller, Cary, NC (US)

(73) Assignee: Nexans, Paris (FR)

( * ) Notice: Subject to any disclaimer, the term of this patent is extended or adjusted under 35 U.S.C. 154(b) by 131 days.

(21) Appl. No.: 12/985,558

(22) Filed: Jan. 6, 2011

(65) Prior Publication Data

US 2012/0177330 A1   Jul. 12, 2012

(51) Int. Cl.
*G02B 6/44* (2006.01)
*G02B 6/36* (2006.01)

(52) U.S. Cl.
CPC ............ *G02B 6/4495* (2013.01); *G02B 6/3664* (2013.01); *G02B 6/4429* (2013.01)
USPC ........................................................ 385/103

(58) Field of Classification Search
USPC ........................................................ 385/103
See application file for complete search history.

(56) References Cited

U.S. PATENT DOCUMENTS

| | | | | |
|---|---|---|---|---|
| 4,220,812 A * | 9/1980 | Ney et al. | ................. | 174/117 F |
| 4,952,020 A * | 8/1990 | Huber | ................. | 385/114 |
| 5,053,583 A * | 10/1991 | Miller et al. | ................. | 174/36 |
| 5,148,509 A * | 9/1992 | Kannabiran | ................. | 385/109 |
| 5,162,611 A * | 11/1992 | Nichols et al. | ................. | 174/36 |
| 5,212,756 A * | 5/1993 | Eoll | ................. | 385/114 |
| 5,342,991 A * | 8/1994 | Xu et al. | ................. | 174/117 R |
| 5,602,953 A * | 2/1997 | Delage et al. | ................. | 385/101 |
| 6,259,843 B1 * | 7/2001 | Kondo | ................. | 385/104 |
| 6,879,761 B2 * | 4/2005 | Rogers | ................. | 385/114 |
| 7,154,043 B2 * | 12/2006 | Clark | ................. | 174/113 R |
| 7,194,168 B2 * | 3/2007 | Rosenquist | ................. | 385/114 |

FOREIGN PATENT DOCUMENTS

| | | | | |
|---|---|---|---|---|
| DE | 4004229 | * | 8/1991 | ............ H01B 7/02 |
| JP | 2006-30909 | * | 2/2006 | ............ G02B 6/44 |
| JP | 2006-78815 | * | 3/2006 | ............ G02B 6/44 |

* cited by examiner

*Primary Examiner* — Charlie Peng
(74) *Attorney, Agent, or Firm* — Sofer & Haroun, LLP

(57) ABSTRACT

A fiber optic arrangement includes a primary strand, a plurality of secondary connection strands, each of which is coupled to the primary strand at a notch. Tight buffer optical fibers are attached, one at the end of each of the secondary connection strands.

13 Claims, 3 Drawing Sheets

TIGHT BUFFER FIBER OPTIC CABLES FOR CONDUITS

BACKGROUND

1. Field of the Invention

This application relates to fiber optic cables. More particularly, this application relates to tight buffer fiber optic cable for conduits.

2. Description of Related Art

In the area of fiber optic cables, fibers, such as tight buffered optical fibers, are frequently bundled into packages so that they can be easily installed within conduits. For example, rectangular conduits are often used along dwelling units, apartments etc . . . . Within these conduits tight buffer fibers are installed in bundled packages. Periodically one fiber from the bundle is pulled out for entry into a specific dwelling unit for installation.

One current prior art solution is shown in FIG. 1. In this arrangement seven tight buffer fibers are each placed within a subunit (extra aramid strength embers and an additional jacket over the tight buffer fiber), which are then assembled into a group of subunits forming a bound assembly. This allows groups of fiber/subunits to be easily installed in conduits along dwelling units. However, to access one subunit/fiber in this bound assembly, first the binder for the assembly needs to be removed or cut and the fiber/subunit needs to be removed (from under the binder). Additionally, to get to the tight buffer fiber itself, the subunit (extra jacket and aramid fibers) must be opened and the tight buffer fiber core needs to be removed from the surrounding aramids.

OBJECTS AND SUMMARY

The present arrangement provides a cable/cable assembly that is best constructed to be placed within such conduits, including rectangular conduits, where each individual fiber is easily accessible yet simultaneously protect from stress.

To this end the present arrangement has a fiber optic arrangement including a primary strand, a plurality of secondary connection strands, each of which is coupled to the primary strand at a notch. Tight buffer optical fibers are attached, one at the end of each of the secondary connection strands.

BRIEF DESCRIPTION OF THE DRAWINGS

The present invention can be understood through the following description and accompanying drawings, wherein.

DETAILED DESCRIPTION

Figure 1:
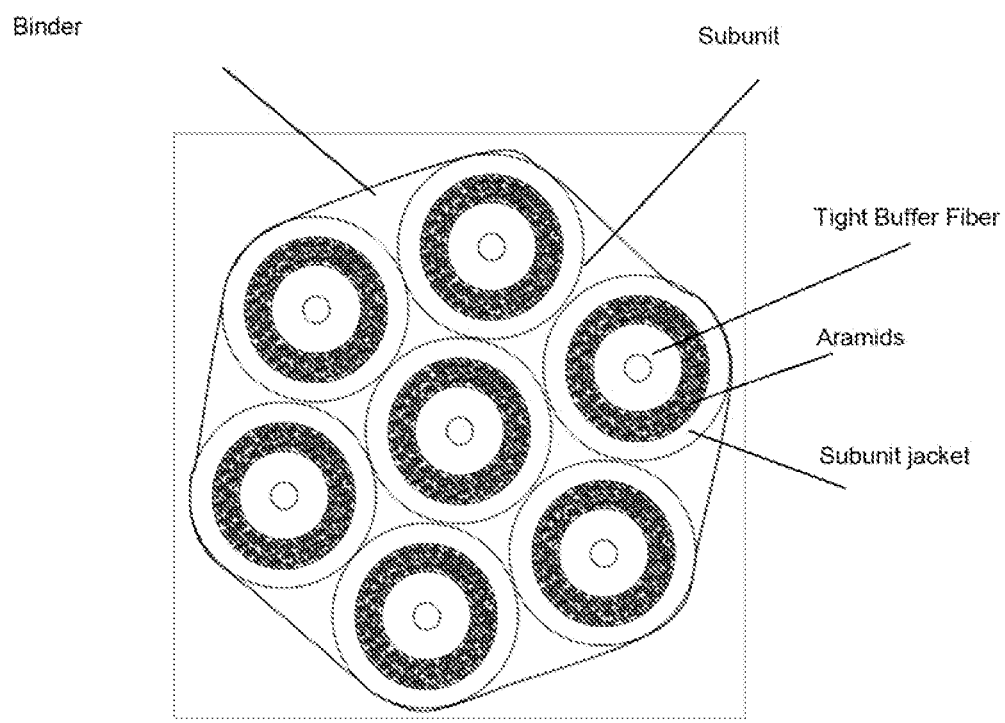
FIG. 1 is a prior art tight buffer fiber assembly.
Figure 2:
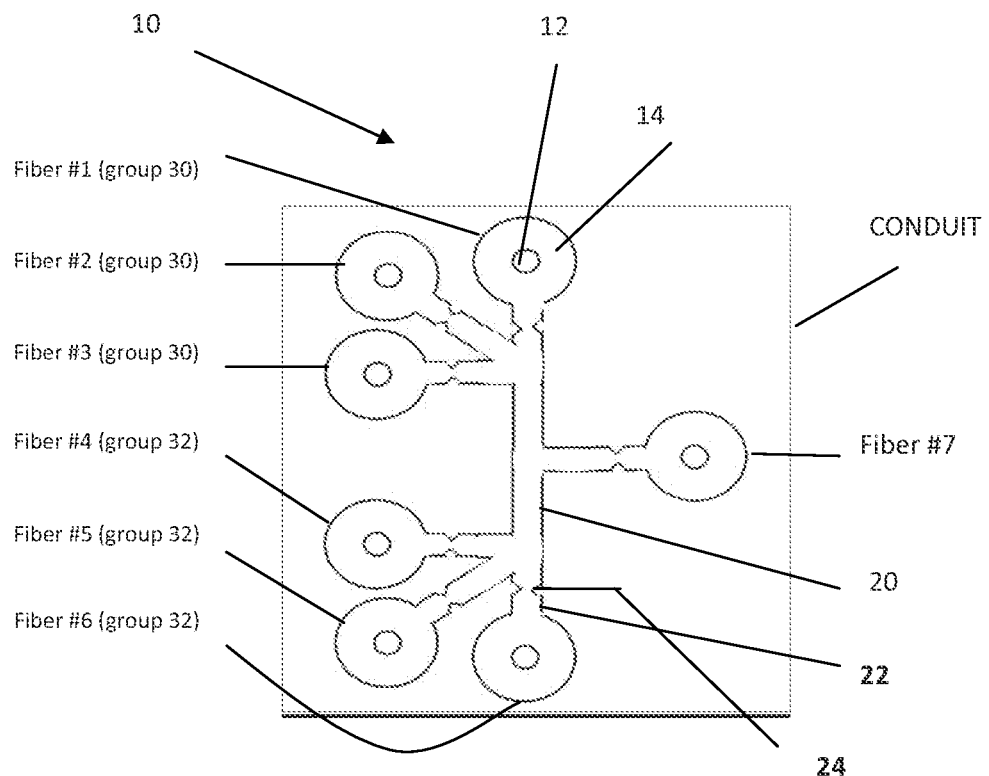
FIG. 2 shows a fiber optic assembly according to one embodiment.

As shown in FIG. 2 an exemplary conduit is shown with a fiber optic assembly therein (described in detail below). The conduit shown is rectangular in cross section, but other such conduits are also used, including typical circular cross section conduits. The present arrangement for a fiber optic assembly is ideal for use in the illustrated rectangular conduit of FIG. 2, but is not limited in this respect and may be used in any form of conduit.

FIG. 2 also shows a fiber optic assembly 10 having seven different fiber 12, each of which is within a jacket (tight buffer) 14. Such a shape for assembly 10 is made using a combination of pressure extrusion and shaped extrusion die of the corresponding shape. The polymer used to form assembly 10 and jackets/tight buffering 14 may be selected from any common fiber insulation such as PE (polyethylene), PVC (poly-vinylchloride), FRPVC (flame resistant poly vinyl chloride), FEP (fluorinated ethylene co-polymer) etc . . . , that may be implemented as fiber insulation under the necessary extrusion conditions.

As shown in FIG. 2, assembly 10 has a primary strand 20 and seven secondary connection strands 22, at the end of each of which is a tight buffer optical fiber 12. A notch 24 separates primary strand 20 from each of the seven secondary connection strands. Primary strand 20 is a polymer strand that forms the main backbone of assembly 10 holding the various fibers 12 to the common assembly 10. At the edges of primary strand 20 are thinning notches 24, described in more detail below, to which are connected the various secondary connection strands 22. These connection strands 22 are the polymer strands that connect the various tight buffered fibers 12 to notches 24, prior to their separation from assembly 10.

In one embodiment, the overall size and shape of assembly 10 is substantially 4.77 mm (left to right in FIG. 3) and 5.76 mm (to to bottom in FIG. 3) respectively, which is similar in overall size as the prior art (e.g. about 5.1 mm-6 mm diameter) and thus ideally dimensioned for typical fiber conduits. Such an arrangement is for exemplary purposes. Different bundling of fibers 12 may be employed in assembly 10 within the context of this arrangement.

As shown in FIG. 2, three of fiber 12 are located in a first bundle 30 (fibers #1-3), three of fibers 12 are located in a second bundle 32 (fibers #4-6) and the seventh fiber 12 is located on an opposite side in isolation.

In this arrangement, assembly 10 is irregularly shaped allowing for individual fibers 12 to be identified by their relative position in assembly 10 and, optionally by an associated coloring scheme. The shape of arrangement 10 is such that tight buffer fibers 12 units are positioned and linked to assembly 10 so that they can flex and distribute the load and stress substantially equally amongst each of the seven fibers 12.

Regarding the thicknesses of primary strand 20 secondary connection strands 22, and notch 24, strands 20 and connection strands 22 have a thickness substantially in the range of about 0.250 to 0.600 mm as well as a notch or profile reduction to about 0.134 mm to 0.201 mm to facilitate ease and uniform breakout of individual fibers 12 from the larger assembly 10. Notch 24 thickness is based on a "worst case scenario" to ensure that it is the only portion that tears when a fiber is removed (as opposed to ripping the tight buffering 14 away from fiber 12 during removal of fiber 12 from assembly 10).

For example, tight buffer fiber insulation, such as tight buffering 14 of fibers 12 normally exhibit some ovality/irregularity due to inherent fluctuations in the extrusion process. Thus, where the normal wall thickness of tight buffering 14 of a fiber 12 (0.325 mm), the actually range is from 0.269 mm to 0.381 mm (i.e. +/−30%). Notch 24 thickness takes this inherent variation into account and the thickness is thus set to substantially 50% to 75% below the lower end of the normal variance range (0.269 mm) to between 0.134 mm to 0.201 mm.

It is understood that the above measurements and dimensions for primary strand 20, secondary connection strands 22, and notch 24 of assembly 10 are exemplary and that other dimensions may be used as long as they are adequate to maintain the integrity of assembly 10 during installation.

Figure 3:
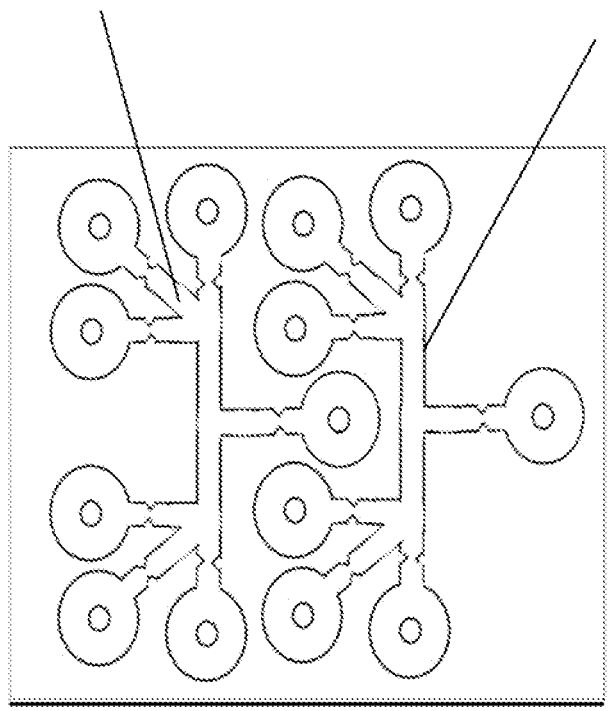
FIG. 3 shows a fiber optic assembly according to another embodiment.

Moreover, although assembly 10 shown in FIG. 3, has seven fibers 12 in a particular special arrangement, this is not intended to be limiting. Other similar arrangements of tight buffered fibers 12 into a sturdy assembly with easy breakout of one fiber 12 are also within the contemplation of the present arrangement.

In an another arrangement, it is noted that assembly 10 in FIG. 3 has a particular arrangement of the seven fibers 12 (#1-7). This arrangement lends itself to the coupling with an adjacent assembly 10 so that more than one assembly 10 may be fit within one conduit, while still retaining an arrangement that makes it easy for an installer to access any one of the fibers 7.

For example, in one arrangement, as shown in the FIG. 3 two assemblies 10 are fitted together with the #7 fiber 12 of a first assembly being fitted in a quasi-locking arrangement between the #3 and #4 fibers 12 of a second assembly. To achieve this, the gap between the #3 and #4 fibers in assembly 10 (fibers that would enclose the #7 fiber 12 from the adjacent assembly 10 where the two assemblies snap together) is about 0.630 mm-0.810 mm or roughly 70-90% of 0.900 mm, the normal diameter of a tight buffer fiber 12.

The invention claimed is:

1. A fiber optic cable, said cable comprising:
   A vertically elongate primary strand that runs longitudinally along the length of the cable;
   a plurality of secondary connection strands, each of which extend away from said vertically elongate primary strand, with said plurality of secondary connection strands running longitudinally along the length of the cable with said vertically elongate primary strand; and
   a single tight buffer optical fiber located at an end of each of said secondary connection strands away from said vertical elongate primary strand,
   wherein each of said secondary connection strands includes a notch for independently removing said single tight buffer optical fiber from said fiber optic arrangement.

2. The fiber optic arrangement as claimed in claim 1, wherein said vertically elongate primary strand, said plurality of secondary connection strands and insulation on said tight buffer optical fibers is formed using a combination of pressure extrusion and a shaped die.

3. The fiber optic arrangement as claimed in claim 1, wherein a thicknesses of said vertically elongate primary strand, and said secondary connection strands have a thickness substantially in the range of about 0.250 to 0.600 mm.

4. The fiber optic arrangement as claimed in claim 3, wherein the thickness of a tight buffer insulation on said tight buffer optical fibers is substantially 0.325 mm +/−30% (0.269 mm to 0.381 mm).

5. The fiber optic arrangement as claimed in claim 4, wherein a thickness of said notches is substantially between 50% to 75% less than the minimum thickness (0.269 mm) or substantially about 0.134 mm to 0.201 to ensure that said notches are the only thing that tears when one of said tight buffer fiber optic elements from said vertically elongate primary strand.

6. The fiber optic arrangement of claim 1, wherein said arrangement is substantially 4.77 mm by 5.76 mm.

7. A fiber optic arrangement as claimed in claim 1, wherein said arrangement is irregularly shaped in order to allow for individual fibers among said tight buffer optical fibers to be identified by their relative position.

8. The fiber optic arrangement as claimed in claim 1, wherein said fiber optic arrangement has at least two bundles of fibers and at least one tight buffer optical fiber located on an opposite side of said at least two bundles, each of said bundles comprising at least one tight buffer optical fiber.

9. The fiber optic arrangement as claimed in claim 8, wherein said fiber optic arrangement has seven tight buffer optical fibers coupled to ends of seven secondary connection strands.

10. The fiber optic arrangement as claimed in claim 9, wherein three of said tight buffer optical fibers are arranged in said first bundle of fibers and wherein three of said tight buffer optical fibers are arranged in said second bundle of fibers, with the seventh fiber located on an opposite side of said arrangement in isolation.

11. The fiber optic arrangement as claimed in claim 10, wherein the shape of said arrangement is such that the tight buffer optical fibers are positioned and linked to said vertically elongate primary strand so that they can flex and distribute the load and stress substantially equally amongst each of the seven optical fibers.

12. The fiber optic arrangement as claimed in claim 10, wherein a gap between a optical fiber in said first bundle of fibers is disposed substantially 0.630 mm-0.810 mm (or roughly 70-90% of 0.900 mm) from an adjacent second optical fiber in said second bundle of fibers.

13. A fiber optic assembly employing two fiber optic arrangements as claimed in claim 12, wherein said seventh optical fiber element of said first fiber optic arrangement is engaged in said gap between said optical fiber in said first bundle of fibers and said adjacent second optical fiber in said second bundle of fibers such that said first and second fiber optic arrangements are removably coupled with one another in said assembly.

\* \* \* \* \*